United States Patent
Druffel et al.

(10) Patent No.: US 10,047,236 B1
(45) Date of Patent: Aug. 14, 2018

(54) METHODS FOR MAKING COPPER INKS AND FILMS

(71) Applicant: University of Louisville Research Foundation, Inc., Louisville, KY (US)

(72) Inventors: Theodore Druffel, Louisville, KY (US); Ruvini Dharmadasa, Louisville, KY (US); Menaka Jha, Louisville, KY (US); Delaina Amos, Louisville, KY (US)

(73) Assignee: UNIVERSITY OF LOUISVILLE RESEARCH FOUNDATION, INC., Louisville, KY (US)

( * ) Notice: Subject to any disclaimer, the term of this patent is extended or adjusted under 35 U.S.C. 154(b) by 0 days.

(21) Appl. No.: 14/485,382

(22) Filed: Sep. 12, 2014

Related U.S. Application Data

(60) Provisional application No. 61/877,077, filed on Sep. 12, 2013.

(51) Int. Cl.
| | | |
|---|---|---|
| *B05D 3/00* | (2006.01) | |
| *C08J 7/18* | (2006.01) | |
| *G21H 5/00* | (2006.01) | |
| *C09D 11/52* | (2014.01) | |
| *H01B 1/02* | (2006.01) | |
| *H01B 13/00* | (2006.01) | |

(52) U.S. Cl.
CPC ............ *C09D 11/52* (2013.01); *H01B 1/02* (2013.01); *H01B 13/003* (2013.01); *H01B 13/0016* (2013.01); *H01B 13/0026* (2013.01)

(58) Field of Classification Search
CPC .......... C09D 11/52; B22F 9/24; B22F 1/0018; B22F 1/02
See application file for complete search history.

(56) References Cited

U.S. PATENT DOCUMENTS

| | | | |
|---|---|---|---|
| 7,931,941 B1 * | 4/2011 | Mastropietro | B22F 7/04 427/376.6 |
| 2007/0180954 A1 * | 8/2007 | Kim | B22F 1/0018 75/373 |
| 2011/0296950 A1 * | 12/2011 | Buscall | B22F 1/0022 75/370 |

OTHER PUBLICATIONS

Kim et al; Intense pulsed light sintering of copper nanoink for printed electronics, Appl. Phys. A-Mater. Sci. Process., 2009, 97, 791-798.*

Liu et al; Preparation of Cu nanoparticles with NaBH4 by aqueous reduction method, Transactions of Nonferrous Metals Society of China, 2012, 22, 117-123.*

(Continued)

*Primary Examiner* — Michael P Wieczorek
(74) *Attorney, Agent, or Firm* — Stites & Harbison, PLLC; Terry L. Wright

(57) ABSTRACT

The presently-disclosed subject matter includes methods for making a copper ink. In some embodiments the methods comprise forming an aqueous solution that includes copper and adding an amount of a surfactant to the aqueous solution to thereby produce a copper ink that includes a dispersion of copper nanoparticles. In some embodiments the methods further include adding an amount of a reducing agent to the aqueous solution. In some instances the copper inks are formed from copper salts, and in some embodiments the copper inks do not include oxides of copper. The presently-disclosed subject matter also includes copper inks formed by the presently-disclosed methods as well as methods of forming a copper film from a copper ink.

6 Claims, 11 Drawing Sheets

(56) References Cited

OTHER PUBLICATIONS

Hirai et al; Preparation of Polymer-Protected Collodial Dispersions of Copper; Bull. Chem. Soc. Jpn., vol. 59; Feb. 1986; pp. 367-372. (Year: 1986).*

Perelaer, et al., Novel approaches for low temperature sintering of inkjet-printed inorganic nanoparticles for roll-to-roll (R2R) applications, Advanced materials, 2012, 24, 2620-2625.

Kang, et al, Inkjet printed electronics using copper nanoparticle ink; Journal of Materials Science: Materials in Electronics, 2010, 21, 1213-1220.

Park, et al., Direct writing of copper conductive patterns by ink-jet printing; Thin Solid Films, 2007, 515, 7706-7711.

Kim, et al., Intense pulsed light sintering of copper nanoink for printed electronics, Appl. Phys. A-Mater. Sci. Process., 2009, 97, 791-798.

Ryu, et al, Reactive Sintering of Copper Nanoparticles Using Intense Pulsed Light for Printed Electronics, J. Electron. Mater., 2011, 40, 42-50.

Liu, et al., Preparation of Cu nanoparticles with NaBH4 by aqueous reduction method, Transactions of Nonferrous Metals Society of China, 2012, 22, 117-123.

Hwang, et al., In situ monitoring of flash-light sintering of copper nanoparticle ink for printed electronics, Nanotechnology, 2012, 23, 485205.

Dharmadasa, et al. Room Temperature Synthesis of a Copper Ink for the Intense Pulsed Light Sintering of Conductive Copper Films; ACS Applied Materials and Interfaces, 2013, 5, 24, 13227-13234.

Akhavan, et al. Processing Thick Film Screen Printed Metalon CuO reduction Ink with Pulse Forge Tools, from http://www.novacentrix.com/sites/default/files/files/Novacentrix%20Tech%20Coatings%200313_final.pdf, Date: 2013.

* cited by examiner

METHODS FOR MAKING COPPER INKS AND FILMS

RELATED APPLICATION

This application claims priority from U.S. Provisional Patent Application No. 61/877,077, filed Sep. 12, 2013, the entire disclosure of which is incorporated herein by this reference.

TECHNICAL FIELD

The presently-disclosed subject matter relates to methods for making copper nanoparticles and ink compositions that comprise copper nanoparticles. In particular, the presently-disclosed subject matter relates to methods for making compositions that include copper nanoparticles, whereby the compositions can be applied as an ink onto a suitable substrate to produce a conductive copper film.

BACKGROUND

Efficient materials and low energy manufacturing techniques are needed for the production of conductive patterns. Direct printing of conductive materials has garnered interest from researchers and industry in the past few years. The conductive ink market is expected to exceed $3 billion in the next few years in a wide array of end point uses including antennas, RFID tags, photovoltaics, flexible electronics and displays. The advantages stem from the cost savings over traditional techniques such as vacuum deposition and photolithography. The reduction in costs are reflected by large area scalability, efficient energy and materials usage, and the availability of existing manufacturing capacity.

Solution phase inks and pastes are typically composed of metallic particles suspended in an organic solvent or binder. Silver in the form of flakes is the most predominant material used in the direct printing of conductive lines. The photovoltaic industry is expected to become a major consumer of silver for conductive current collectors that are typically deposited using screen printing techniques and sintered using thermal processing. There have been a number of applications utilizing silver nanoparticles in inkjet formulations and sintering using lower temperature methods such as inert gas plasmas, microwaves, and intense pulsed light (IPL). These help reduce overall costs, but such devices still rely on a relatively expensive silver.

Inexpensive materials such as copper that utilize the lower temperature sintering processes above could further reduce the costs associated with conductive patterns. Copper and silver have very similar electrical conductivity and copper is significantly less expensive. However, silver is commonly used in printed electronics because it is stable in air, whereas copper tends to oxidize during the sintering process, which significantly reduces conductivity. Copper inks have been developed that utilize reducing capping agents on pure copper nanoparticles to produce conductive patterns at temperatures between 200° C. and 320° C. using inert gas plasmas. However, these dispersions rely on pure copper nanoparticles using relatively complex processes that inevitably add costs.

In addition, because copper nanoparticles oxidize under ambient conditions, the presence of oxides on the surface can result in the need for higher processing temperatures as well as significant reductions in conductivity. Techniques for synthesizing copper nanoparticles include electrochemical deposition, hydrothermal methods, electrolysis, microwave assisted polyol methods, reverse micellar synthesis, sonochemical methods, thermal reduction, and thermal decomposition of copper oxalate, which leads to the formation of the powder form of copper rather than an ink to make conductive films. In some instances the instability of copper even under atmospheric conditions commonly results in the use of organic stabilizers such as poly(N-vinyl-pyrrolidone) to reduce the copper oxide on the surface of the nanoparticles during the intense pulsed light process.

Hence, there remains a need for methods to overcome the shortcomings of known deposition techniques as well as known copper compositions that are prone to oxidation. There also remains a need for cost-effective materials and methods for applying conductive film patterns onto a substrate which can also resist oxidation.

SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

Embodiments of the presently-disclosed subject matter include methods of making a copper ink that comprise forming an aqueous solution that includes copper, and adding an amount of a surfactant, such as TERGITOL, to the aqueous solution to thereby produce a copper ink including a dispersion of copper nanoparticles. In some embodiments the copper nanoparticles have a size of about 1 nm to about 100 nm. The copper in the aqueous solution can include a copper salt, such as $Cu(NO_3)_2$. In some embodiments the aqueous solution further comprises ethylene glycol.

In some embodiments the methods for making a copper ink further comprise, after the adding step, heating the aqueous solution to a temperature of about 130° C. to about 150° C. to thereby produce the copper ink. In certain embodiments that include a heating step, a reducing agent is not added to the aqueous solution.

On the other hand, some embodiments further include a step of adding an amount of a reducing agent to the aqueous solution, optionally at a concentration of about 0.05 M to about 0.6 M. Exemplary reducing agents include those selected from $NaBH_4$, citrate, ascorbic acid, and combinations thereof. In some embodiments, before the adding step, a pH of the aqueous solution is adjusted to a basic pH, such as a pH of about 7 to 12 (e.g., about 11). Some embodiments of methods for making copper inks with a reducing agent can be performed at about ambient temperature.

The presently-disclosed subject matter also includes copper inks formed by the present methods. The present copper inks can include copper nanoparticles that are not composed of oxides of copper and do not use a surfactant and an aqueous solution. In some embodiments the copper nanoparticles comprise of Cu alone or in combination with oxides of copper (e.g., $Cu_2O$). Embodiments of copper inks can further comprise a reducing agent.

Furthermore, the presently-disclosed subject matter also includes methods of forming a copper film from a copper nanoparticle ink. The method can comprise forming an aqueous solution that includes copper, adding an amount of a surfactant to the aqueous solution to produce the copper ink, the copper ink including a dispersion of copper nanoparticles that do not include oxides of copper (e.g., CuO), applying the copper ink to a substrate, and sintering the copper ink. The substrate may include glass, polymers, and combinations thereof. In some embodiments the copper ink is applied by inkjet printing, screen printing, roll-coating, gravure, spraying by aerosol, spin-casting, or a combination thereof.

In yet other embodiments the sintering process includes an intense pulsed light sintering process. In some embodiments the induced pulsed light sintering comprises applying pulses of light (e.g., 180-3000 nm) having an energy of about 1 to about 50 $Jcm^{-2}$ to the copper ink, including, in some embodiments, pulses of light having a total energy of about 1 $Jcm^{-2}$ to about 2000 $Jcm^{-2}$.

DESCRIPTION OF THE DRAWINGS

Illustrative aspects of embodiments of the presently-disclosed subject matter will be described in detail with reference to the following figures wherein.

DESCRIPTION OF EXEMPLARY EMBODIMENTS

Figure 1:
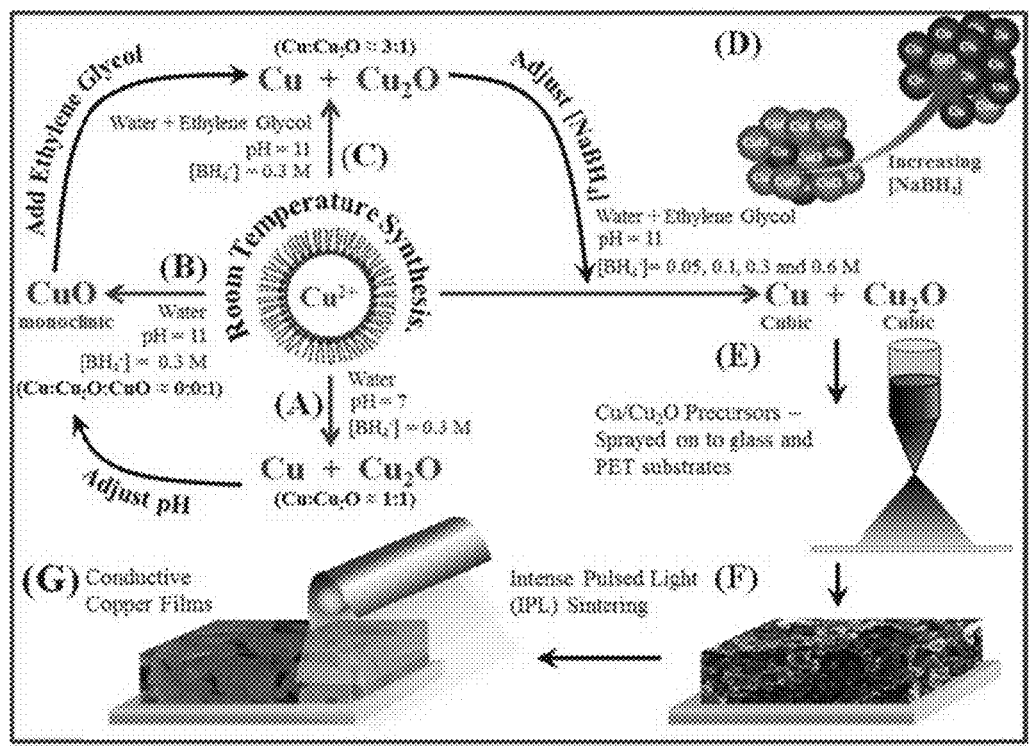
FIG. 1 includes a schematic showing (steps A-D) the synthetic route for the fabrication of copper nanoparticulate ink, (step E) applying the copper ink to a substrate, and (step F) intense pulsed light sintering of the ink films to (step G) form conductive copper films.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter includes methods for making a copper ink. In this respect, conducting films are becoming increasingly important for the printed electronics industry with applications in various technologies including, but not limited to, antennas, RFID tags, photovoltaic, flexible electronics, and displays. To date, expensive noble metals have been utilized in the conductive films, which ultimately increase manufacturing costs. The presently-disclosed copper inks and methods for making the same are economically viable alternatives for forming copper based conducting films. The presently-disclosed methods for making copper inks include a relatively less complex copper reduction method in the presence of a surfactant (capping agent). Consequently, present methods can be beneficial for use in high through-put applications.

Some embodiments of the presently-disclosed methods for making a copper ink comprise forming an aqueous solution that includes copper, and adding an amount of a surfactant to the aqueous solution to thereby produce a copper ink including a dispersion of copper nanoparticles. In certain embodiments the copper is added to the aqueous solution at a concentration of about 0.1 M, 0.2 M, 0.3 M, 0.4 M, 0.5 M, 0.6 M, 0.7 M, 0.8 M, 0.9 M, 1.0 M, or more. In some instances, the nanoparticles increase in size as the concentration of copper increases in the solution. The surfactant may be a nonionic surfactant. In some embodiments the surfactant is selected from, but is not limited to, TERGITOL (e.g., TERGITOL NP-9, nonylphenol polyethylene glycol ether), CTAB, poly(N-vinyl-2-pyrrolidone) (PVP), and combinations thereof. The term "ink" refers to a solution that can be applied and cured to a surface. Thus, a copper ink refers to an ink that can be applied to deposit copper onto a surface.

The term "nanoparticle" as used herein refers to particles that generally can be measured on a nanometer scale. For example, embodiments of nanoparticles can be about 1 nm, 10 nm, 20 nm, 30 nm, 40 nm, 50 nm, 60 nm, 70 nm, 80 nm, 90 nm, or 100 nm in diameter. Other exemplary nanoparticles can also include diameters of about 100 nm, 200 nm, 300 nm, 400 nm, 500 nm, 600 nm, 700 nm, 800 nm, 900 nm, or 1000 nm. Nanoparticle is therefore a term that can be used to describe the characteristics, and particularly the size, of a particle.

In some embodiments the aqueous solution that includes copper initially includes a salt of copper, or a charged copper atom bound to another charged species. Exemplary copper salts include copper(I) chloride, copper(II) chloride, copper (II) sulfate, copper(II) carbonate, copper(II) nitrate, and the like. In certain embodiments the copper salt includes copper (II) nitrate, or $Cu(NO_3)_2$. Copper salts may also include hydrates thereof. Accordingly, unless expressly stated otherwise, the term "copper" as used herein can refer to pure copper, copper salts, hydrates of copper salts, and the like.

In some implementations, the present methods can further comprise heating the aqueous solution after the step of adding a surfactant. The heating can decompose the copper in the aqueous solution to form copper nanoparticles. Thus, the heating step can produce a copper ink comprised of copper nanoparticles. In some embodiments the heating step includes heating the aqueous solution from room temperature to a temperature of about 130° C. In some embodiments the aqueous solution is heated to a temperature of about 130° C. to about 150° C. In other embodiments the heating step includes heating the aqueous solution to a temperature of at least about 100° C., at least about 110° C., at least about 120° C., at least about 130° C., at least about 140° C., at least about 150° C., at least about 160° C., at least about 170° C., at least about 180° C., at least about 190° C., or at least about 200° C.

In this regard, in some embodiments that include a step of heating the aqueous solution, a reducing agent need not be added to the aqueous solution. Thus, in some embodiments, a step of heating the aqueous solution can form copper nanoparticles that are partially or fully reduced without the addition of a separate reducing agent. Embodiments of the present methods for making copper inks can therefore provide a conductive copper ink without requiring the additional step, time, or expense of having to incorporate a separate reducing agent.

Other embodiments for making a copper ink can further include a step of adding an amount of a reducing agent to the aqueous solution. The term "reducing agent" is used herein to refer to one or more substances that can reduce an oxidized form of copper, such as CuO or $Cu_2O$. Exemplary reducing agents can be selected from, but are not limited to, borohydride, such as sodium borohydride (i.e., $NaBH_4$), citrate, ascorbic acid, and combinations thereof. The reducing agent can be added at varying concentrations to the aqueous solution to adjust the amount and type of oxidized copper in the resulting copper nanoparticles. In certain embodiments the reducing agent is added so that it is present at a final concentration in the aqueous solution of about 0.025 to about 1 M, including about 0.025 M, 0.05 M, 0.10 M, 0.15 M, 0.20 M, 0.25 M, 0.30 M, 0.35 M, 0.40 M, 0.45 M, 0.50 M, 0.55 M, 0.60 M, 0.65 M, 0.70 M, 0.75 M, 0.80 M, 0.85 M, 0.90 M, 0.95 M, or 1.0 M.

Additionally, in some embodiments of the present methods for making a copper ink the pH of the aqueous solution is adjusted to a basic pH. The pH of the aqueous solution can be adjusted to a basic either before, during, or after a step of adding a surfactant and an optional reducing agent to the aqueous solution. The basic pH includes a pH that is over 7.0 pH. In certain embodiments the basic pH is selected from a pH of about 7.5, 8.0, 8.5, 9.0, 9.5, 10.0, 10.5, 11.0, 11.5, 12.0, 12.5, 13.0, 13.5, and 14.0. In some embodiments the basic pH is a pH of at least about 8, at least about 9, at least about 10, at least about 11, or at least about 12.

Accordingly, in some embodiments of the presently-disclosed subject matter, a method of making a copper ink is provided that comprises the steps of: forming an aqueous solution of copper having a neutral pH, adjusting the neutral pH of the aqueous solution to a basic pH, and adding an amount of a reducing agent to the aqueous solution to thereby produce a dispersion of copper nanoparticles.

In some embodiments that comprise a step of adding a reducing agent, the method of making the copper ink can be performed at substantially ambient temperature. Therefore, in some embodiments a step of adding a reducing agent can be performed in addition to or instead of a step of heating the aqueous solution. In some instances the ability to make the present nanoparticles and inks at relative low or ambient temperatures can facilitate and reduce the costs of the manufacturing process. The ability to make the present nanoparticles and inks at relatively low or ambient temperature can also prevent the formation of undesirable alloys, thereby preserving the properties attributable to the materials of the nanoparticles.

Upon reviewing this paper, those of ordinary skill will appreciate that the present nanoparticles can include both oxidized and unoxidized forms of copper. In some instances a copper nanoparticle can include partially reduced copper nanoparticles, or nanoparticles that are comprised of a combination of $Cu_2O$ and pure Cu. In other instances a copper nanoparticles can exclusively include reduced copper nanoparticles that only comprise pure Cu.

As discussed herein, reducing treatments can be applied to oxidized forms (e.g., CuO and $Cu_2O$) of copper nanoparticles to convert them to unoxidized forms, and vice versa. Thus, unless explicitly recited otherwise, the nanoparticles described herein include both oxidized and unoxidized forms of the nanoparticles. For instance, reference to a copper nanoparticle can refer to pure a Cu nanoparticles, a $Cu_2O$—Cu nanoparticle, or both.

Some embodiments of the present methods do not include CuO at any stage of the process for making a copper ink. For instance, an exemplary method uses a copper salt as a precursor to make copper nanoparticles comprised of Cu and/or $Cu_2O$. Thus, in some implementations the copper inks formed by the present methods do not include CuO as a precursor. CuO must be reduced to Cu in order to impart conductive properties to the ink. However, the CuO is first reduced to an intermediate phase ($Cu_2O$) before becoming pure Cu. Without being bound by theory or mechanism, the additional step of having to convert CuO to $Cu_2O$ prior to converting $Cu_2O$ to Cu may require additional reducing agents and/or a higher total energy input when compared to embodiments of the present methods that do not utilize CuO. Thus, the embodiments of the present methods do not require a two-step reduction process to convert CuO to Cu can function with fewer reducing agents and/or less energy to form conductive copper inks. In some instances this can provide the benefit of reducing the time and expense required to produce conductive copper inks relative to methods that utilize CuO as a precursor or intermediate substance.

In some embodiments the aqueous solution can further comprise an organic solvent. Exemplary organic solvents include, but are not limited to, ethylene glycol, propylene glycol, diethylene glycol, and combinations thereof. In some embodiments the aqueous solution can also comprise a surfactant.

In this regard, the presently-disclosed subject matter also includes a copper ink formed from the methods described herein. Embodiments of the presently-disclosed subject matter can comprise a copper ink made by forming an aqueous solution that includes copper, and then adding an amount of a surfactant to the aqueous solution. In some embodiments the copper inks are made by heating the solution that includes the copper and the surfactant to produce copper nanoparticles. In other embodiments the copper inks are made by adding a reducing agent to the aqueous solution to thereby produce a copper ink that comprises reduced copper nanoparticles. In embodiments wherein a reducing agent is utilized, the copper nanoparticles can be formed at about ambient temperature. Furthermore, in some embodiments the pH of the aqueous solution is adjusted to a basic pH to make the copper nanoparticles. In some embodiments the copper inks are comprised of nanoparticles that include $Cu(NO_3)_2$, Cu, or a combination thereof. In some embodiments the copper inks do not comprise CuO.

Further still, the presently-disclosed subject matter includes methods for forming a copper film from a copper nanoparticle ink. In some embodiments the methods first include a step of providing a copper ink that includes copper nanoparticles, followed by a step of applying the copper ink to a substrate, and then sintering the copper ink to form a conductive copper film on the substrate. In some embodiments the copper ink can be applied directly onto a substrate and sintered to form a copper film without additional processing.

The substrate is not particularly limited, and can include a variety of materials that require a conductive film. In some implementations the substrate is selected from glass, polymer, and combinations thereof. The substrate may include silicon. The polymer can be selected from, but is not limited to, polyimide, polyethylene terephthalate, polyethylene naphthalate, polyethylene, polycarbonate, polystyrene, polyvinyl chloride, polyethylene terephthalate (PET), and the like. In some embodiments the substrate is coated with one or more additional layers, such as diffusion barrier layers (e.g., nickel layer). A copper ink can be applied to the surface of a coated substrate, and the term "substrate" refers to both coated and uncoated varieties of substrates. Those of ordinary skill will recognize other substrates that can be used in the present methods for forming copper films and that can be used in electronics or other devices.

The copper ink can be any of the copper inks described herein. The providing step includes obtaining the copper ink by any means, including making the copper ink by the methods described herein. Some embodiments of methods for forming a copper film include a step of providing a copper ink by forming an aqueous solution that includes copper, and then a step of adding an amount of a surfactant to the aqueous solution to produce the copper ink. As described herein, in some embodiments the method further includes a step of heating the aqueous solution to produce the copper ink. In other embodiments the copper ink is made by adding a reducing agent to the aqueous solution. Furthermore, in some embodiments, the pH of the aqueous solution is adjusted to a basic pH during the process for making a copper ink, including in methods wherein a reducing agent is added in the aqueous solution.

The step of applying the copper ink to a substrate can be accomplished by a variety of methods known in the art. In some embodiments the step of applying the copper ink to a substrate includes applying the copper ink by a method such as, but not limited to, inkjet printing, screen printing, gravure, roll-coating, spraying by aerosol, spin-casting, a combination thereof, and the like.

Sintering of the copper ink can convert the dispersion of copper nanoparticles into a substantially uniform copper film. In some embodiments sintering is performed with intense pulsed light (IPL). Xenon lamps can be used to emit incoherent intense pulsed light from the UV to the IR region. The nanoparticles absorb the light, resulting in a localized temperature rise at the surface that can sinter the particle to its neighboring nanoparticles. This allows the nanoparticles to form a continuous conductive film. Sintering can also cause the copper nanoparticles to adhere to the surface of the underlying substrate.

The short pulse time (e.g., milliseconds) results in the process having relatively fast kinetics. As a result, sintering can occur with little or no oxidation. Intense pulsed light also has the ability to sinter relatively large areas relatively quickly. Thus, the rapidity with which intense pulsed light can sinter copper inks permits the process to rapidly sinter large areas with limited overheating and limited copper oxidation. This makes intense pulsed light beneficial for certain industrial and high through-put applications.

In some embodiments a copper ink can be sintered to make a copper film with a single intense light pulse. In other embodiments multiple intense light pulses are used to sinter a copper ink into a copper film. For example, in some embodiments 5, 10, 15, 20, 25, 30, 35, 40, 45, 50, 55, 60, 65, 70, 75, 80, 85, 90, 95, or more pulses of intense pulsed light are used to sinter a copper ink into a copper film.

In some implementations the intensity of each intense light pulse, the total number of intense light pulses, or both can depend from the total energy to be applied by intense pulsed light. For instance, in some implementations the each intense light pulse emits about 1 $Jcm^{-2}$ to about 50 $Jcm^{-2}$, including about 1 $Jcm^{-2}$, 5 $Jcm^{-2}$, 10 $Jcm^2$, 15 $Jcm^{-2}$, 20 $Jcm^{-2}$, 25 $Jcm^{-2}$, 30 $Jcm^{-2}$, 35 $Jcm^{-2}$, 40 $Jcm^{-2}$, 45 $Jcm^{-2}$, or 50 $Jcm^{-2}$. Furthermore, in some implementations the total energy emitted by the intense light pulse(s) can be in the range of about 1 $Jcm^{-2}$ to about 2000 $Jcm^{-2}$, including about 100 $Jcm^{-2}$, 200 $Jcm^{-2}$, 300 $Jcm^{-2}$, 400 $Jcm^{-2}$, 500 $Jcm^{-2}$, 600 Jcm$^{-2}$, 700 Jcm$^{-2}$, 800 Jcm$^{-2}$, 900 Jcm$^{-2}$, 1,000 Jcm$^{-2}$, 1,100 Jcm$^{-2}$, 1,200 Jcm$^{-2}$, 1,300 Jcm$^{-2}$, 1,400 Jcm$^{-2}$, or 1,500 Jcm$^{-2}$, 1,600 Jcm$^{-2}$, 1,700 Jcm$^{-2}$, 1,800 Jcm$^{-2}$, 1,900 Jcm$^{-2}$, or 2,000 Jcm$^{-2}$.

In some embodiments the atmosphere is altered at least during the sintering step to limit the extent to which the copper oxidizes, if at all. In some embodiments the sintering step is performed in an inert atmosphere to remove at least oxygen from the environment. An inert atmosphere can include nitrogen gas, argon gas, and the like.

The sintering step itself, in some embodiments, can itself further reduce the copper inks. The components of the aqueous solution, which can include a reducing agent, surfactant, water, and solvent, evaporate upon being heated during sintering. The evaporated components of the solution can pass through and can reduce the copper nanoparticles either partially or completely during the sintering process. The reduction of the copper due to sintering can convert some or all of the $Cu_2O$ present in the nanoparticles to Cu.

The presently-disclosed subject matter also includes copper films made by the present methods for making copper films. As discussed herein, the copper ink can comprise $Cu_2O$ and Cu or pure Cu nanoparticles. During the copper film forming process the copper nanoparticles are sintered, which itself may further reduce the copper oxide in the copper nanoparticles. Accordingly, the presently-disclosed copper films can comprise pure Cu or levels of $Cu_2O$ sufficiently low to permit the copper films to be conductive. In some embodiments the copper films include sheet resistances of 0.12Ω/□.

EXAMPLES

The presently-disclosed subject matter is further illustrated by the following specific but non-limiting examples. The examples may include compilations of data that are representative of data gathered at various times during the course of development and experimentation related to the presently-disclosed subject matter.

Example 1

This Example describes a process for synthesizing copper inks at room temperature. The copper inks can then be utilized in a boarder overall process that is shown schematically in FIG. 1. Specifically, this Example examines the first steps of nanoparticle (NP) synthesis (FIGS. 1A to 1D) and the control of oxide species in the formulation (FIG. 1D). The copper NPs ($Cu/Cu_2O$) were developed by observing (1) the solvent system, (2) the pH of the reaction, and (3) the concentration of $NaBH_4$ used in the reaction.

Commercially available TERGITOL NP-9 (Sigma Aldrich, 99%; St. Louis, Mo.) was used as the capping agent for the synthesis of the copper nanoparticles. Anhydrous copper nitrate ($Cu(NO_3)_2$, Alfa Aesar, 99.99%), ethylene glycol ($C_2H_6O_2$, Alfa Aesar, 99.5%; Ward Hill, Mass.), sodium borohydride ($NaBH_4$, Sigma Aldrich, 98%), and ammonium hydroxide (Fisher Scientific, 29.18%; Waltham, Mass.) were used in the synthesis.

5 ml of TERGITOL and 100 ml of water were added to a 50 ml aqueous solution of 0.1 M $Cu(NO_3)_2$. To this solution, 50 ml of aqueous sodium borohydride ($NaBH_4$, 0.3 M) was added and the reaction was then stirred for 2 h, which produced a $Cu/Cu_2O$ NP dispersion with a pH of 7 (FIG. 1A).

The pH of the solution was adjusted from pH 7 to 11 by adding ammonium hydroxide ($NH_4OH$) drop-wise, and the process was repeated to produce a CuO NP dispersion (FIG. 1B).

The aqueous inks were desirable as a low cost and environmentally friendly solution. However, water presented complications as an oxidizer, and a co-solvent could minimize the formation of copper oxides. Thus, the reaction was repeated by replacing 100 ml of water with 100 ml of ethylene glycol. Furthermore, because $NaBH_4$ decomposes rapidly at low pH and even in neutral conditions its reactivity can be compromised, the copper nanoparticle ink synthesis was adjusted to pH 11 using ethylene glycol as the solvent (FIG. 1C).

To further increase the amount of the Cu at room temperature, the process was repeated yet again by varying the concentration of reducing agent ($NaBH_4$) between 0.05 M, 0.1 M, 0.3 M, and 0.6 M to produce a $Cu/Cu_2O$ NP dispersions (FIG. 1D). The copper nanoparticle dispersions obtained using ethylene glycol at pH 11 were used in the fabrication of the copper films described in Example 2.

Figure 2:
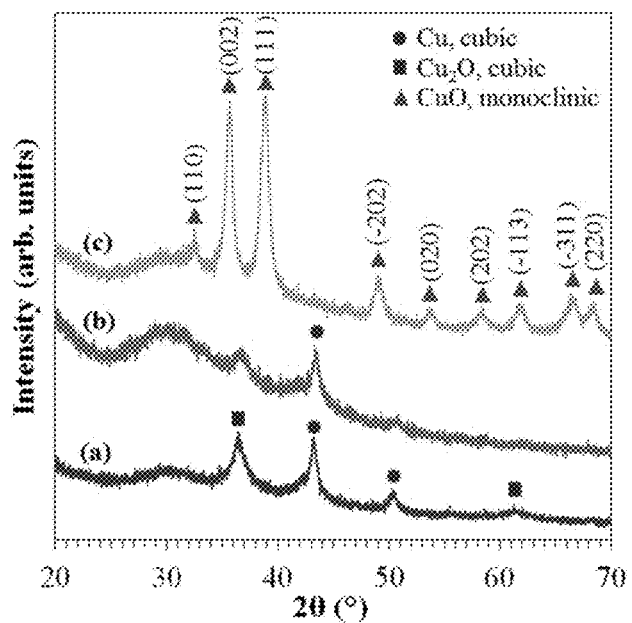
FIG. 2 includes powder x-ray diffraction patterns for copper nanoparticle ink obtained at (a) pH=7 without ethylene glycol, (b) pH=11 with ethylene glycol, and (c) pH=11 without ethylene glycol.

Powder and film X-ray diffraction (PXRD or XRD) studies were carried out on a Bruker AXS D8 X-ray diffractometer (Billerica, Mass.) using Ni-filtered Cu—K$_\alpha$ radiation with a step size of 0.02° and a scan speed of 1 sec/step. Raw data was subjected to background correction and Kα2 lines were removed. FIG. 2 shows the PXRD of the copper NPs obtained in the different solutions and at the different pHs. The PXRD diffraction patterns show that the NPs formed in water at pH 7 were a mixture of approximately equal amounts of Cu and $Cu_2O$. Both materials crystallized in cubic structures with the space group of Fm3m and Pn3m. At pH 11 with a water solvent the PXRD patterns of the NPs formed showed the presence of pure monoclinic CuO (FIG. 2(c)). The PXRD diffraction pattern also show that ethylene glycol addition could be used as a way to reduce the oxides and increase the Cu yield. At pH of 11, in the presence of ethylene glycol, a mixture of Cu and $Cu_2O$ was obtained (FIG. 2(b)) at a ratio of approximately 3:1. The increase in the yield of Cu in the ink suggested that a reducing environment was generated by the presence of the ethylene glycol.

Figure 3:
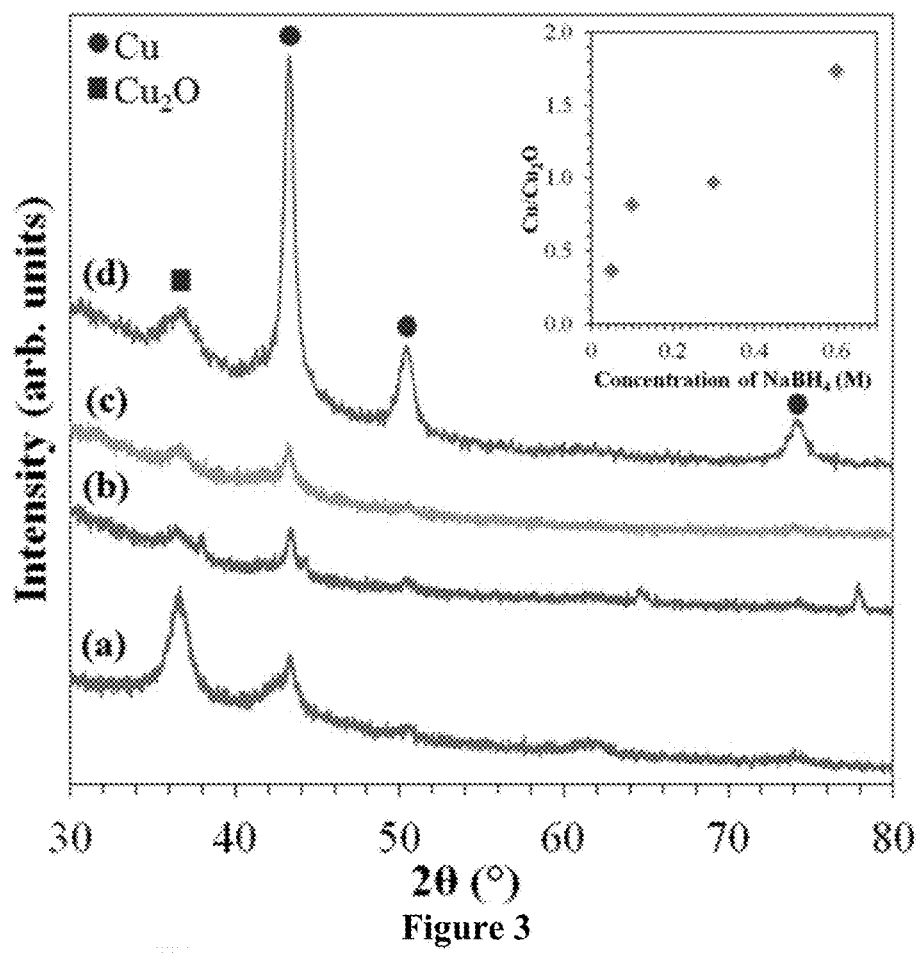
FIG. 3 includes powder x-ray diffraction patterns for copper nanoparticle ink obtained at pH=11 in presence of ethylene glycol by the reaction of copper salt with sodium borohydride ($NaBH_4$) at concentration of (a) 0.05 M, (b) 0.1 M, (c) 0.3 M, and (d) 0.6 M. Inset shows the variation of ratio of Cu (111) intensity to $Cu_2O$ (111) intensity versus sodium borohydride concentration, where the inset shows the yield of $Cu/Cu_2O$ versus the concentration of $NaBH_4$.

The ratio of the $Cu/Cu_2O$ increased substantially linearly as the concentration of $NaBH_4$ was adjusted from 0.05 to 0.6 molar, as shown in FIG. 3. All the patterns show a mixture of Cu and $Cu_2O$. As the $NaBH_4$ concentration was increased from 0.05 M to 0.6 M, the yield of copper in the copper NP ink also increased (inset of FIG. 3). Without being bound by theory or mechanism, the $NaBH_4$ in the presence of ethylene glycol further facilitated the reducing environment, evidenced by the $Cu/Cu_2O$ ratio more than doubling as the $NaBH_4$ concentration was increased to 0.6 M. Under these conditions the copper NP ink was composed of Cu with a small amount of $Cu_2O$.

Example 2

This Example describes a processes for using intense pulsed light sintering to make conductive copper films from the copper inks described in Example 1. More specifically, this Example examines a process for spraying these copper ink species onto a surface using an air assisted microsprayer (FIG. 1E) to form a nanoparticulate film of mixed copper and copper oxides (FIG. 1F), and further examines a process for sintering the films using intense pulsed light to produce a conductive thin film of copper (FIG. 1G).

To this point, the Example also demonstrates the ability to tune the ratio of Cu/Cu$_2$O in a copper ink by controlling the reactants and reaction conditions during synthesis. Accordingly, inks with varying percentages of Cu were used to make sheets in order to determine how Cu concentration in the ink affects the resistivity of the resulting Cu film.

Films were prepared from copper nanoparticle (mixture of copper (I) oxide and copper) dispersions having varying concentrations of NaBH$_4$ at pH 11 with ethylene glycol. The excess solvent was decanted until the remaining mixture contained approximately 50 vol % solids. In order to disperse the nanoparticles in the solution and to break up any large agglomerates, the mixture was ultrasonicated using a VirSonic Ultrasonic Cell Disrupter 100. Films were deposited by spraying the mixture on to glass substrates preheated to 160° C. using a Nordson EFD 787MS-SS Microspray Valve (Westlake, Ohio), which resulted in wide area coverage of copper in two dimensions. The films were labeled according to the concentration of NaBH$_4$ used in the reaction solution (e.g. 0.05, 0.1, 0.3 or 0.6 M).

The films were placed in an inert nitrogen atmosphere and were sintered with pulses of light. The Cu$_2$O in the deposited films was reduced to Cu during the intense pulsed light process in order to achieve low resistance since the electrical conductivity of Cu is several orders of magnitude greater than Cu$_2$O or CuO. Additionally, the NPs was sintered by increasing the temperature of the film to create a continuous network of electronic pathways; leading to a low sheet resistance ($R_s$). To accomplish this, a Sinteron 2000 (Xenon Corporation; Wilmington, Mass.) was used to produce pulses of intense light, and the system was fitted with a linear 30 cm Xenon lamp that generated pulses of incoherent light with wavelengths ranging from 190 to 1000 nm. Pulse durations could be changed from 0.58, 1.00, 1.50, to 2.00 ms, and the interval time between pulses could be varied from a minimum time of 0.1 s to tens of minutes.

The system was also equipped to generate pulses with energy of 150 to 2000 J, which corresponds to an energy density of 2.5 to 34.5 Jcm$^{-2}$, respectively. The energy output of the pulse was changed by varying the high voltage setting. The processing area of the Sinteron 2000 was approximately 58 cm$^2$ with a focal length of approximately 2.5 cm (i.e. distance from lamp to sample). The energy of each pulse was varied from 590 (10.2 Jcm$^{-2}$) to 2000 J (34.5 Jcm$^{-2}$), which was done by adjusting the high voltage from 1.6 to 3.0 kV. A voltage setting of 1.6, 1.8, 2.0, 2.2, 2.4, 2.6, 2.8, and 3.0 kV generated a pulse with an energy density of, respectively, 10.2, 12.9, 15.5, 19.0, 22.4, 26.7, 31.1, and 34.5 Jcm$^{-2}$.

Since generally more than one pulse is required to sinter films greater than 5 μm in thickness on glass, ten pulses of light were applied at each ED setting to the films. The total energy input to the film was varied by increasing the voltage in 0.2 kV increments, in order to systematically increase the ED of the pulses. For example, a total energy input of 386 J cm$^{-2}$ comes from 10 pulses at 1.6 kV+10 pulses at 1.8 kV+10 pulses at 2.0 kV. This "cumulative" method was used to sinter the copper particles, in order to remove residual organic material in the film, before the top surface of the films could melt. If the top of the film melted before all of the volatile organic material has been removed the film could be prone to blistering, which could lead to delamination.

An Alpha-Step 500 surface profiler (Technor Instruments; Gessate, Italy) was used to measure the thickness of the as-deposited films. The films had a thickness of approximately 7 μm to 10 μm.

Figure 4:
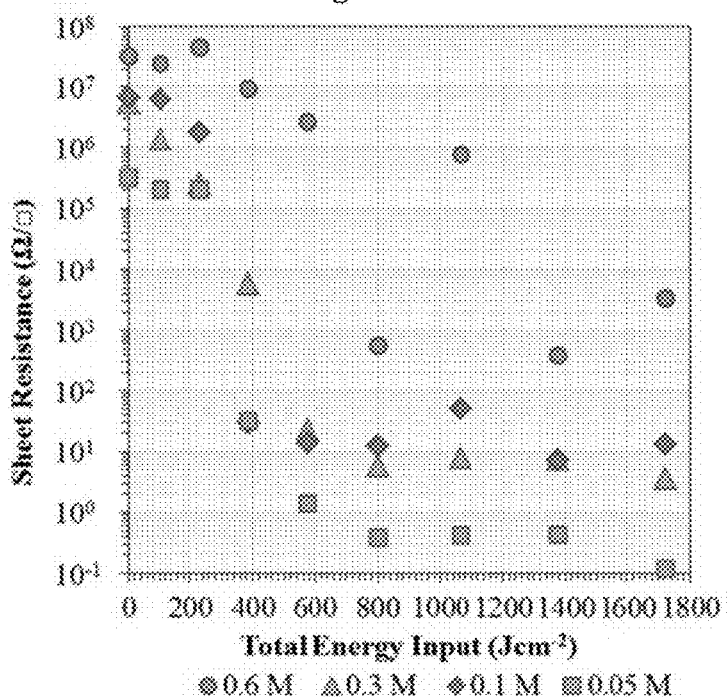
FIG. 4 includes a plot showing sheet resistance versus total energy input during the intense pulsed light treatment for films that were fabricated from the 0.6 M, 0.3 M, 0.1 M, and 0.05 M $NaBH_4$ dispersions.

The sheet resistance of the films was measured with a 4-point probe attached to a Keithley 2400 source-meter (Keithley Instruments; Cleveland, Ohio). FIG. 4 shows the $R_s$ of the Cu/Cu$_2$O films deposited from the 0.05, 0.1, 0.3 and 0.6 M NaBH$_4$ dispersions at varying ED. Films deposited from the 0.6 M dispersion displayed $R_s$'s greater than 100Ω/□, even after a total energy input of 1723 Jcm$^{-2}$ was applied to the film, using pulses with a maximum ED of 34.5 Jcm$^{-2}$. In contrast, under similar conditions, the films deposited from the 0.3, 0.1 and 0.05 M dispersions, produced $R_s$'s lower than 10Ω/□. These films also display an inflection point at a total energy input of about 350 Jcm$^{-2}$, where the $R_s$ changed from MΩ/□ to less than 100Ω/□. This indicated that pulses with a minimum ED of 15.5-19.0 Jcm$^{-2}$ reduced and sintered the Cu/Cu$_2$O films. The lowest sheet resistance of 0.118Ω/□ was obtained from the 0.05 M dispersion, after 1723 Jcm$^{-2}$ was applied to the film. The films were deposited over a wide area (10 cm$^2$) to demonstrate a bulk copper film technique. As a comparison, a film thickness of 7.97 μm yielded a bulk resistivity of 9.40×10$^{-5}$ Ωcm.

The XRD patterns of the powders (FIG. 3) showed the 0.6 M dispersion had the highest Cu content and should have produced a lower sheet resistance. To further characterize the sintering process, TEM were taken of the particles from the 0.05 and 0.6 M dispersions. TEM was carried out using a Tecnai G$^2$ 20 electron microscope (FEI Company; Hillsboro, Oreg.) operated at 200 kV. TEM specimens were prepared by dispersing the oxide powder in ethanol by ultrasonic treatment. A few drops were deposited onto a porous carbon film supported on a copper TEM grid (Ted Pella, Inc.; Redding, Calif.) and then dried in air.

Figure 5A:
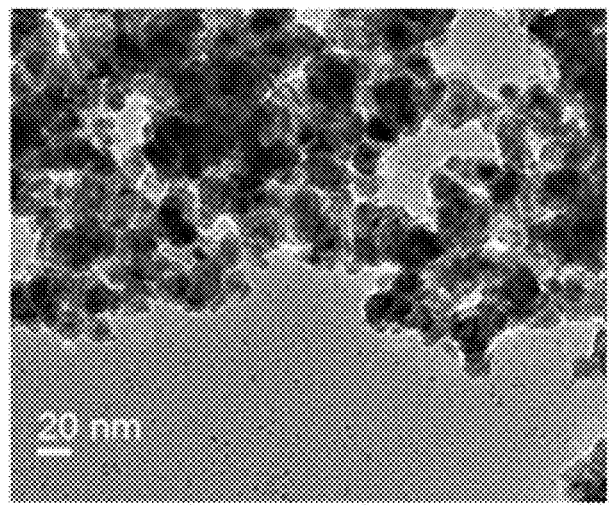
FIG. 5A includes a transmission electron microscope (TEM) image showing a $Cu/Cu_2O$ nanoparticle ink obtained at pH=11 in presence of ethylene glycol by the reaction of copper nitrate with 0.05 M sodium borohydride.
Figure 5B:
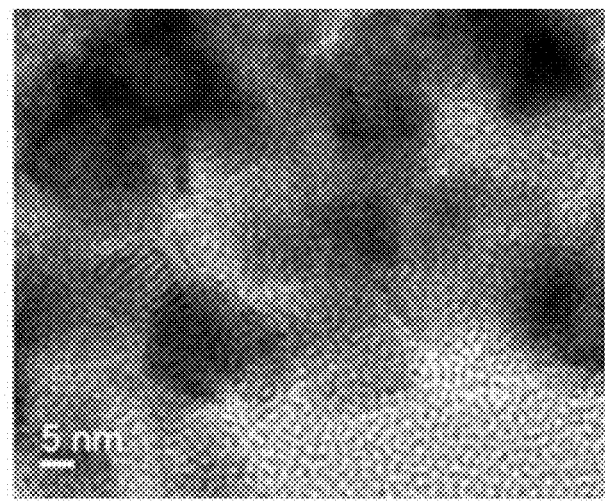
FIG. 5B includes a high-resolution transmission electron microscopy (HRTEM) image showing a $Cu/Cu_2O$ nanoparticle ink obtained at pH=11 in presence of ethylene glycol by the reaction of copper nitrate with 0.05 M sodium borohydride.
Figure 5C:
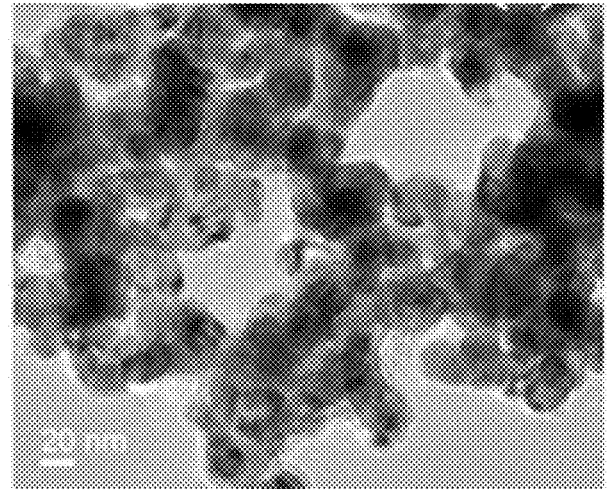
FIG. 5C includes a TEM image showing a $Cu/Cu_2O$ nanoparticle ink obtained at pH=11 in presence of ethylene glycol by the reaction of copper nitrate with 0.6 M sodium borohydride.

A TEM micrograph of the copper NP ink obtained using 0.05 M NaBH$_4$ shows the formation of NPs 10-15 nm particles (FIG. 5A). The particle size increased to 20-30 nm when the NaBH$_4$ concentration was increased to 0.6 M, (FIG. 5C). It is appreciated that the melting point at the surface is significantly lower than in the bulk of the material, due to the weak bonding of the surface atoms. Thus, without being bound by theory or mechanism, these atoms have a lower cohesive energy than atoms found in the bulk of the material. In elemental solids, the cohesive energy has an approximately linear relationship with the melting point temperature. In the NP regime, the NP surface area becomes significantly larger relative to NP volume, thereby reducing the average cohesive energy of the particle is reduced. This effect can result in the NPs having melting point temperatures several hundred degrees lower than the bulk material. Indeed, pure Cu models have predicted that particles less than about 20 nm in diameter can have a decrease in their melting temperature. For example, Cu particles with a diameter of 30 nm have a melting temperature similar to the bulk (i.e., 1084° C.), while Cu particles having a size of about 10 nm have a melting temperature of approximately 900° C.

Figure 5D:
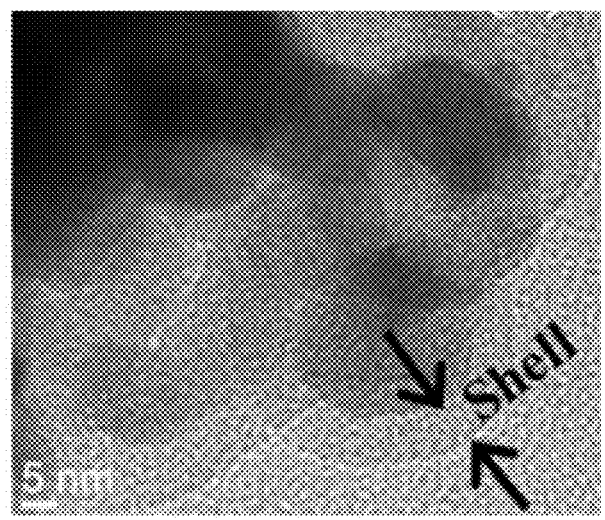
FIG. 5D includes a HRTEM image showing a $Cu/Cu_2O$ nanoparticle ink obtained at pH=11 in presence of ethylene glycol by the reaction of copper nitrate with 0.6 M sodium borohydride.

Accordingly, without being bound by theory or mechanism, the improved conductivity may be a result of improved electronic pathways due to the smaller particles sintering more effectively, which is supported by FIG. 4. Further, it was also noted in the HRTEM images that a shell exists around the NPs synthesized using 0.6 M NaBH$_4$ (FIG. 5D) that is missing from those synthesized using 0.05 M NaBH$_4$ concentration (FIG. 5B). Due to the transparency of this layer, it is likely an organic shell. The presence of this layer may limit the melting between neighboring NP.

Figure 6A:
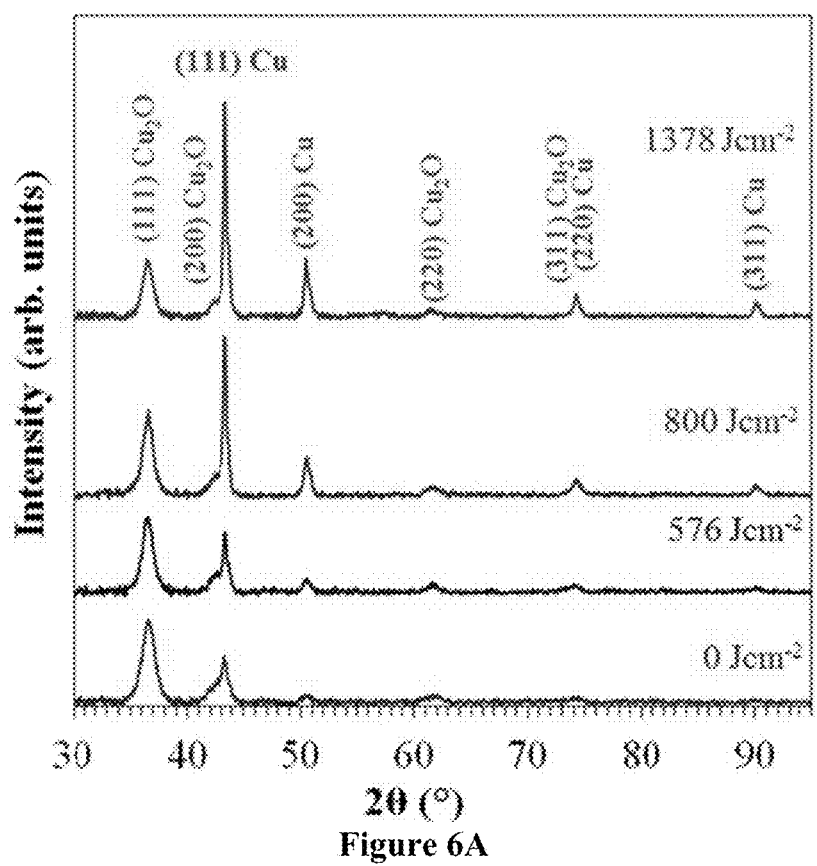
FIG. 6A includes a plot showing X-ray diffraction (XRD) patterns of $Cu/Cu_2O$ films deposited from a 0.05 M $NaBH_4$ dispersion before intense pulsed light sintering with a total energy input of 0 $Jcm^{-2}$, 576 $Jcm^{-2}$, 800 $Jcm^{-2}$, 1378 $Jcm^{-2}$, and 1723 $Jcm^{-2}$.
Figure 6B:
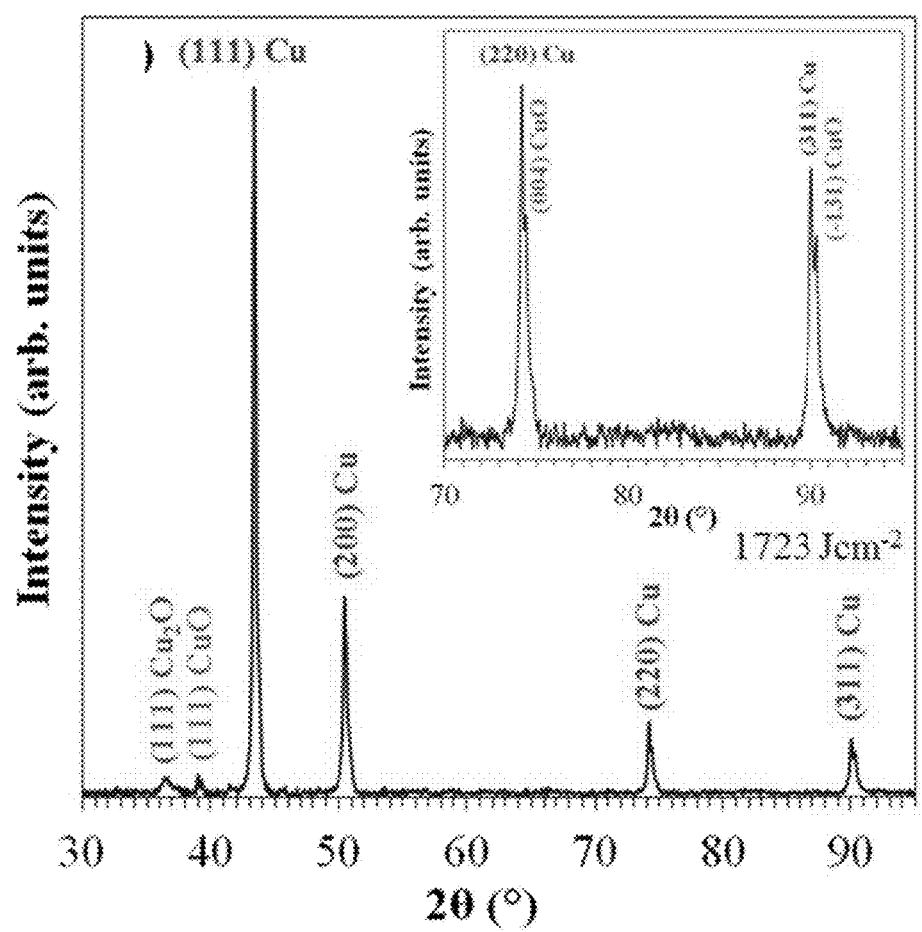
FIG. 6B includes a plot showing XRD patterns of $Cu/Cu_2O$ films deposited from a 0.05 M $NaBH_4$ dispersion after intense pulsed light sintering with a total energy input of 0 $Jcm^{-2}$, 576 $Jcm^{-2}$, 800 $Jcm^{-2}$, 1378 $Jcm^{-2}$, and 1723 $Jcm^{-2}$, where the insets shows an enlarged view of the plot.

Further analysis of the intense pulsed light treatment on the copper particles was carried out using films fabricated from the 0.05 M NaBH$_4$ dispersions. FIGS. 6A and 6B show the XRD patterns of the as-deposited and intense pulsed light treated films, respectively. The as-deposited sample was indexed to the (111), (200), (220) and (311) crystalline planes of cubic $Cu_2O$ ICDD(00-001-1142) and cubic Cu ICDD(00-001-1241) (FIG. 6A). Upon intense pulsed light treatment, the reflections belonging to Cu became more crystalline and appeared prominently in the XRD diffraction patterns (FIG. 6B). These Cu reflections had a narrower reflection than those corresponding to $Cu_2O$, indicating that in addition to $Cu_2O$ to Cu conversion, the crystallite size of Cu became larger due to particles melting and coalescing.

Figure 6C:
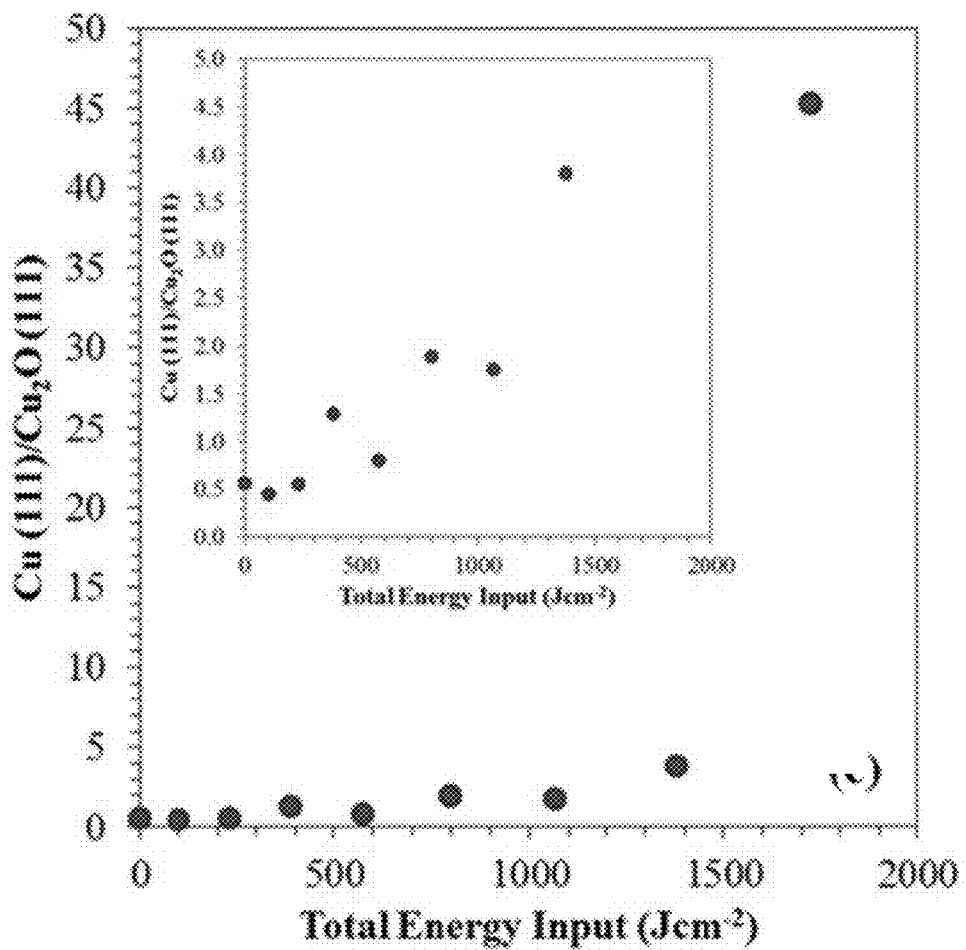
FIG. 6C includes plots showing the ratio of Cu (111) intensity to $Cu_2O$ (111) intensity versus total energy input during intense pulsed light treatment, where the insets shows an enlarged view of the plot.

FIG. 6C shows the ratio of the $(111)_{Cu}/(111)_{Cu2O}$ versus the energy input during the intense pulsed light process. At approximately 400 $Jcm^{-2}$, this value exceeded 1. In other words there was more crystalline Cu than $Cu_2O$ in the films. This transition point was consistent with the observations made during the sheet resistance study, where the transition between $M\Omega/\square$ to $\Omega/\square$ occurred in this region. When a total energy input of 1723 $Jcm^{-2}$ was applied to the films, the $(111)_{Cu}/(111)_{Cu2O}$ ratio exceeded 45. In addition to the melting of copper, the temperature of the film was raised sufficiently for the oxidation of Cu to CuO to be observed.

Figure 7A:
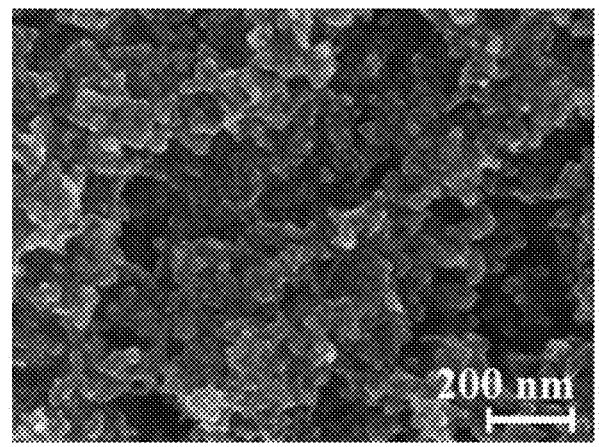
FIG. 7A includes a scanning electron microscope (SEM) topographical image showing a deposited $Cu/Cu_2O$ film before sintering.
Figure 7B:
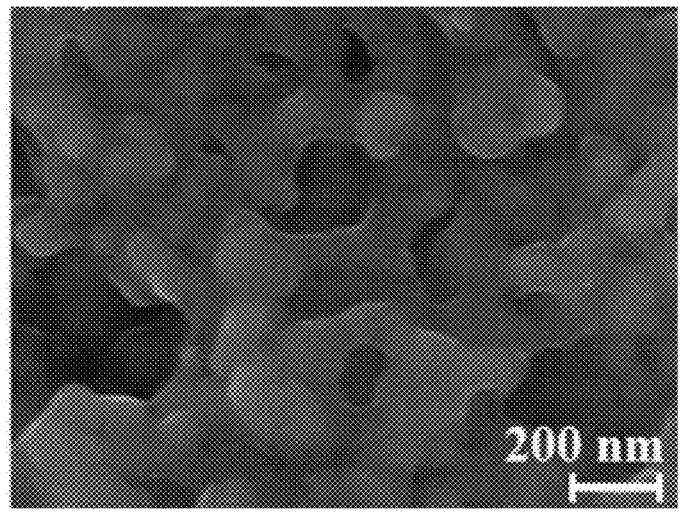
FIG. 7B includes a SEM topographical image showing the $Cu/Cu_2O$ film of FIG. 7A after intense pulsed light sintering with a total energy input of 576 $Jcm^{-2}$.
Figure 7C:
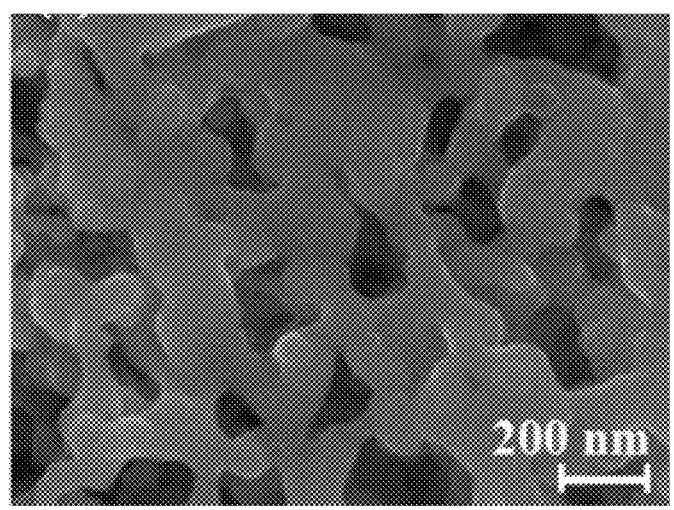
FIG. 7C includes a SEM topographical image showing the $Cu/Cu_2O$ film of FIG. 7A after intense pulsed light sintering with a total energy input of 1723 $Jcm^{-2}$.

FIGS. 7A to 7C show the SEM topographical images of the as-deposited and the 576 and 1723 $Jcm^{-2}$ intense pulsed light treated films, respectively. A FEI Nova NanoSEM 600 was used with an accelerating voltage of 15 kV and a working distance of 5-6 mm. The images showed that the as-deposited $Cu/Cu_2O$ films formed very rough and porous structures (FIG. 7A). The smaller particles agglomerated into small clusters with a width of approximately 50 nm. Applying 576 $Jcm^{-2}$ of energy to the film resulted in significant changes to the morphology; with a large amount of particle coalescence. In FIG. 7B it is possible to see large particles approximately 100 nm wide that started to merge with the neighboring particles to form the electrical pathways. FIG. 7C displays the image of the film treated with 1723 $Jcm^{-2}$ of light. The pathways appeared to be smoother, as further melting of the particles had occurred.

Example 3

This Example describes and characterizes a process for applying and sintering a copper onto a polyethylene terephthalate (PET) substrate. The copper inks described in Example 1 were utilized to coat the PET.

$Cu/Cu_2O$ films were deposited on 0.01 inch thick uncoated moisture resistant polyester (PET, McMaster-Carr; Elmhurst, Ill.). PET has a melting temperature of approximately 150° C.; consequently PET is unable to withstand the high temperature rise of multiple light pulses applied in a short period of time. Thus, the thickness of the $Cu/Cu_2O$ films was reduced to approximately 4 μm by changing the spray parameters. Also, since the intense pulsed light sintering of Cu on glass found that pulses of light with ED's of 22.4 $Jcm^{-2}$ were sufficient to reduce $Cu_2O$ to Cu and sinter the particles in order to make good electrical pathways, only one pulse with an ED of 22.4 $Jcm^{-2}$ and a pulse duration of 2 ms was used to sinter the films on PET. The $Cu/Cu_2O$ films were sintered under both nitrogen and ambient conditions.

Figure 8A:
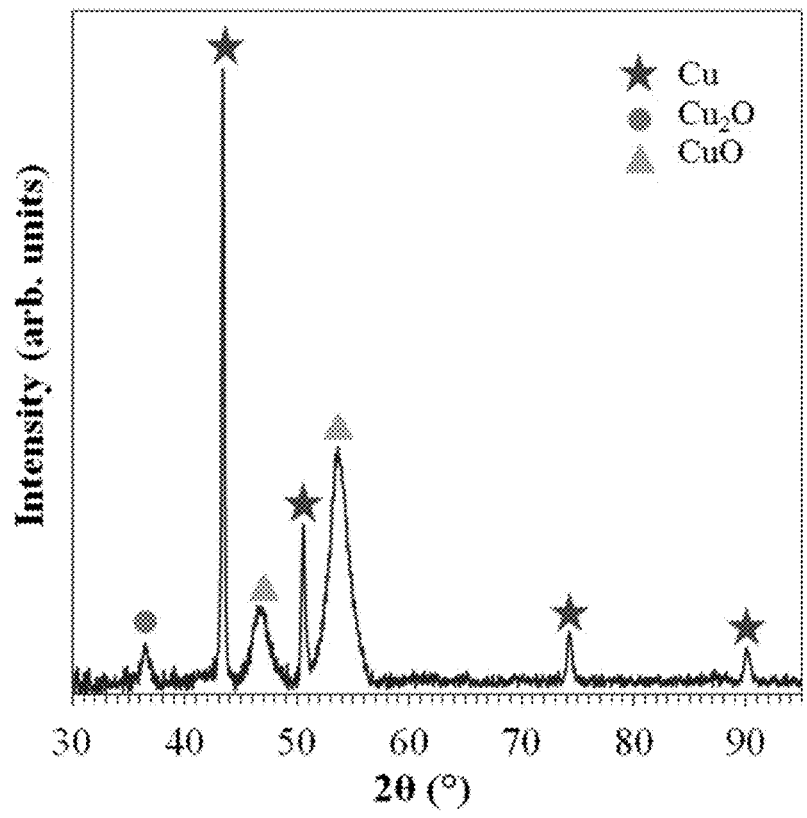
FIG. 8A includes a XRD pattern of an intense pulsed light sintered $Cu/Cu_2O$ film on PET using 1 pulse with an ED of 22.4 $Jcm^{-2}$ in air.

The resulting well-adhered films had a $R_s$ as low as 1.35$\Omega/\square$. In addition, the short sintering time of 2 ms (i.e. the pulse duration) allowed the films to be sintered in air. These films showed no difference in performance when compared to the films processed under nitrogen. FIG. 8A displays the XRD plots of a film sintered in air. The diffraction pattern shows that not all the $Cu_2O$ was reduced to Cu. In addition the pattern shows a significant proportion of the film was oxidized to CuO. However, the Cu content was sufficient to produce the low $R_s$'s.

Figure 8B:
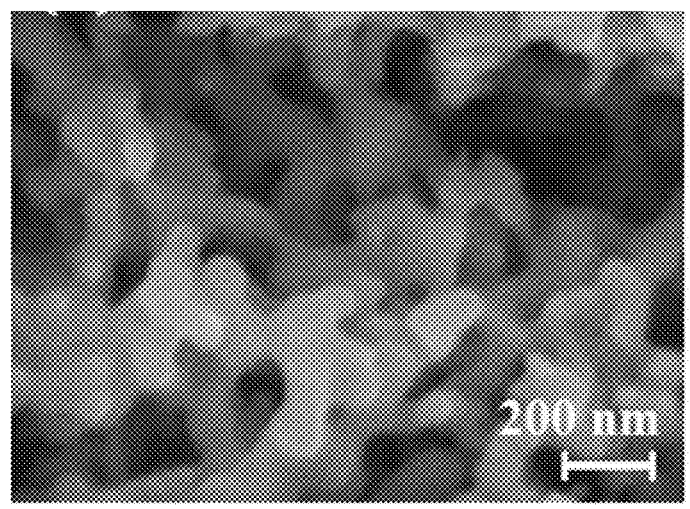
FIG. 8B includes a SEM image showing the intense pulsed light sintered $Cu/Cu_2O$ film on PET using 1 pulse with an ED of 22.4 $Jcm^{-2}$ in air.
Figure 8C:
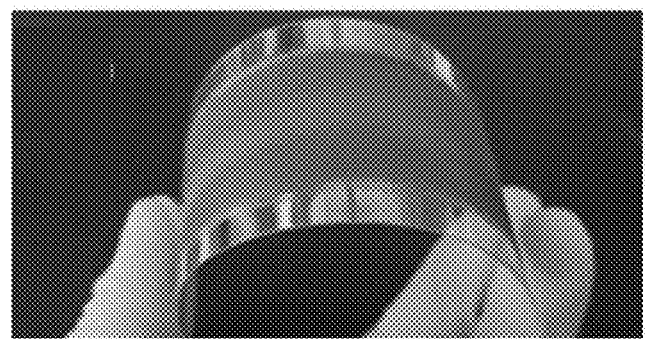
FIG. 8C includes a photograph showing the intense pulsed light sintered $Cu/Cu_2O$ film on PET using 1 pulse with an ED of 22.4 $Jcm^{-2}$ in air.

The intense pulsed light sintered films also displayed a porous network (FIG. 8B). The reduction in the thickness of the films appeared to have resulted in a higher porosity, and consequently the electrical pathways were narrower after sintering. Both the deposition and sintering processes for PET can be adjusted to tune the $R_s$'s.

The ability to use 0.05 M $NaBH_4$ to develop a NP ink for conductive copper patterns at room temperature made this route economically viable and relatively environmentally friendly. $Cu_2O$ NPs may also prolong the inks' lifetime.

Example 4

This Example describes and characterizes a process for synthesizing copper nanoparticles at 130° C. by thermal decomposition of copper ions in the presence of ethylene glycol and TERGITOL. Adjustment of pH and addition of NaBH4, a reducing agent, was not required in this process.

Commercially available TERGITOL NP-9 (Sigma Aldrich, 99%) was used as the capping agent for the synthesis of the copper nanoparticles. Anhydrous copper nitrate $(Cu(NO_3)_2$, Alfa Aesar, 99.99%) and ethylene glycol $(C_2H_6O_2$, Alfa Aesar, 99.5%) were used in the synthesis.

For synthesis of copper nanostructures, 0.9376 g of copper nitrate was dissolved in 6 ml of water and then 5 ml TERGITOL and 44 ml ethylene glycol were added to the solution. The content of water and ethylene glycol used in the solution adjusted the concentration of the copper nitrate to 0.1 M. The sample was then heated in a conical flask on the hot plate and the change in color of the solution as the reaction proceeded over time was observed.

Figure 9:
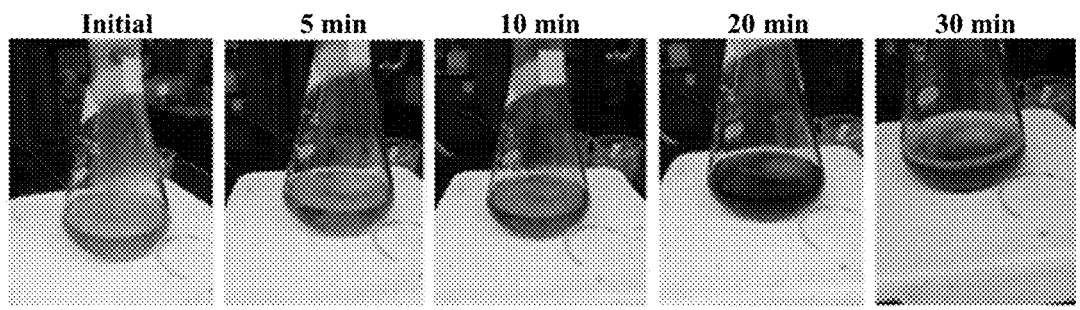
FIG. 9 includes images showing changes in color of a decomposing copper ion solution in the presence of ethylene glycol, water, and TERGITOL.
Figure 10:
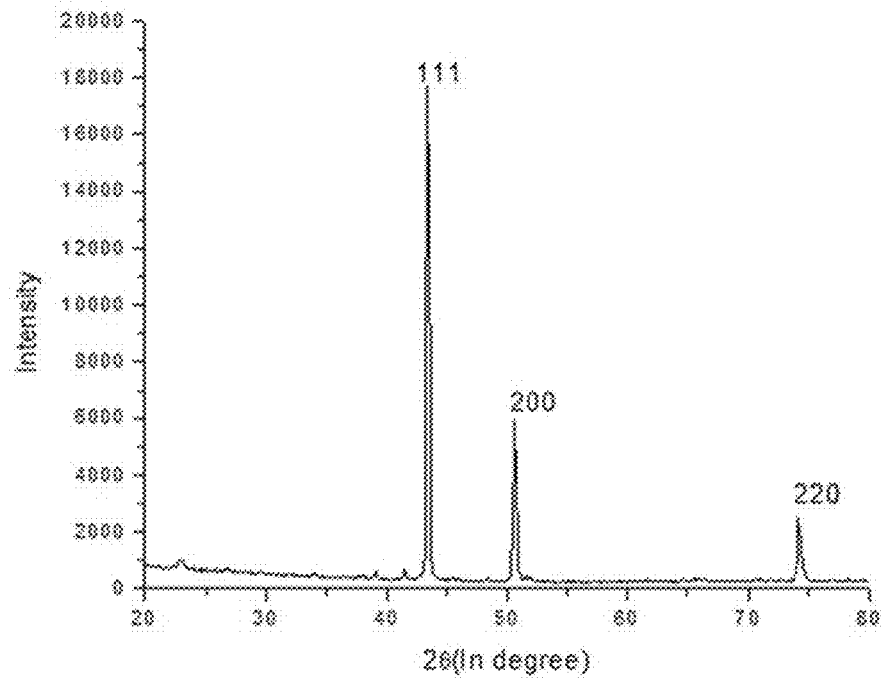
FIG. 10 includes a PXRD pattern obtained after reacting copper ion with ethylene glycol, water, and TERGITOL for 30 minutes at 130° C.
Figure 11A:
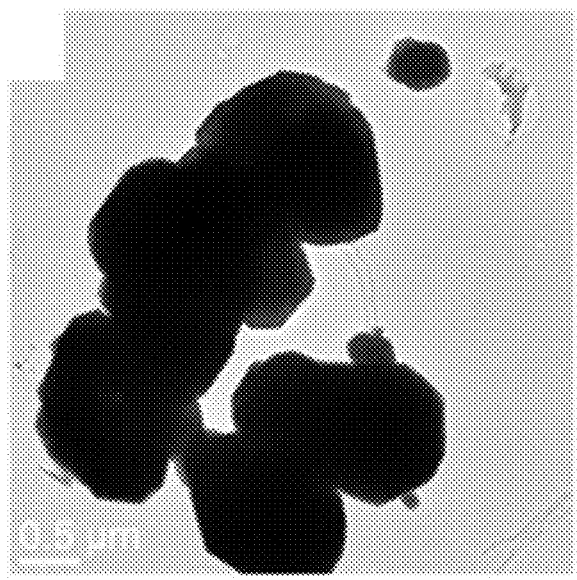
FIG. 11A includes a TEM micrograph showing a copper ion sample obtained after it reacted with ethylene glycol, water, and TERGITOL for 30 minutes at 130° C.
Figure 11B:
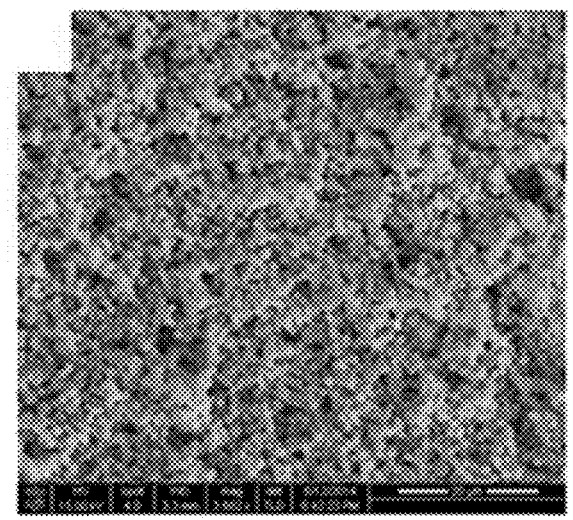
FIG. 11B includes a SEM micrograph showing a copper ion sample obtained after it reacted with ethylene glycol, water, and TERGITOL for 30 minutes at 130° C.

Initially, the sample was blue, and after 30 min it turned into an orange-red color (FIG. 9). The sample obtained after 30 min was centrifuged and washed with acetone twice and then dried in air at 80° C. PXRD pattern of the above sample showed the formation of pure cubic copper. The powder x-ray diffraction pattern was successfully indexed on the basis of JCPDS pattern, 851326 (FIG. 10). Further, the TEM (FIG. 11A) and SEM (FIG. 11B) images showed the formation of spherical particles of about 1 μm.

Figure 12:
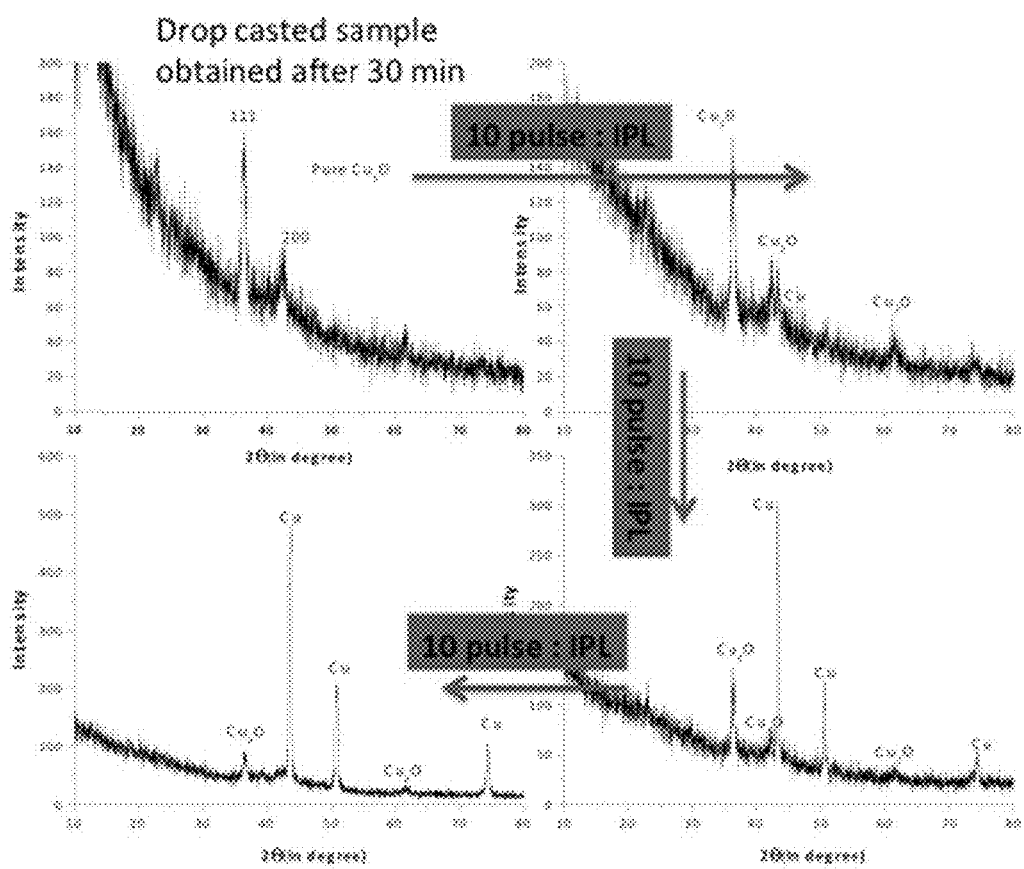
FIG. 12 includes plots showing XRD spectrums of nanoparticle films undergoing an intense pulsed light process, and the plots illustrate that the films are reducing from $Cu_2O$ to Cu faster than the initial formulation.

This formulation was processed with an intense pulsed light sintering method. The nanoparticles tended to improve the rate at which the copper oxide nanoparticles reduced to predominately copper during the intense pulsed light. Specifically, the initial dispersion described in the previous Examples and that were made at room temperature required at least about 50 to 60 pulses to achieve the desired conductivity of the film. On the other hand, the dispersion of this Example achieved the same conductivity in about 30 pulses. This is shown in the XRD data in FIG. 12.

While the terms used herein are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although many methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "a layer" includes a plurality of such layers, and so forth.

The terms "comprising", "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations in some embodiments of ±20%, in some embodiments of ±10%, in some embodiments of ±5%, in some embodiments of ±1%, in some embodiments of ±0.5%, and in some embodiments of ±0.1% from the specified amount, as such variations are appropriate to perform the disclosed method. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Throughout this application, various publications are referenced. All such references, including the follow listed references, are incorporated herein by reference.

REFERENCES

1. K. Ghaffarzadeh and H. Zervos, IDTechEx, 2012.
2. A. Zuser and H. Rechberger, *Resources, Conservation and Recycling*, 2011, 56, 56-65.
3. I. Reinhold, C. E. Hendriks, R. Eckardt, J. M. Kranenburg, J. Perelaer, R. R. Baumann and U. S. Schubert, *J Mater Chem*, 2009, 19, 3384.
4. S. Wünscher, S. Stumpf, A. Teichler, O. Pabst, J. Perelaer, E. Beckert and U. S. Schubert, *J Mater Chem*, 2012, 22, 24569.
5. J. Perelaer, R. Abbel, S. Wunscher, R. Jani, T. van Lammeren and U. S. Shubert, *Advanced materials*, 2012, 24, 2620-2625.
6. J. Perelaer and U. S. Schubert, *J. Mater. Res.*, 2013, 28, 564-573.
7. K. C. Yung, X. Gu, C. P. Lee and H. S. Choy, *Journal of Materials Processing Technology*, 2010, 210, 2268-2272.
8. J. S. Kang, H. S. Kim, J. Ryu, H. Thomas Hahn, S. Jang and J. W. Joung, *Journal of Materials Science: Materials in Electronics*, 2010, 21, 1213-1220.
9. B. K. Park, D. Kim, S. Jeong, J. Moon and J. S. Kim, *Thin Solid Films*, 2007, 515, 7706-7711.
10. K.-S. Kim, J.-O. Bang, Y.-H. Choa and S.-B. Jung, *Microelectronic Engineering*, 2013, 107, 121-124.
11. S. Magdassi, M. Grouchko and A. Kamyshny, *Materials*, 2010, 3, 4626-4638.
12. L. Huang, H. Jiang, J. Zhang, Z. Zhang and P. Zhang, *Electrochemistry communications*, 2006, 8, 262-266.
13. Z. Liu, Y. Yang, J. Liang, Z. Hu, S. Li, S. Peng and Y. Qian, *The Journal of Physical Chemistry B*, 2003, 107, 12658-12661.
14. X. Zhou, A. Harmer, N. Heinig and K. Leung, *Langmuir*, 2004, 20, 5109-5113.
15. M. Blosi, S. Albonetti, M. Dondi, C. Martelli and G. Baldi, *J Nanopart Res*, 2011, 13, 127-138.
16. C. L. Kitchens, M. C. McLeod and C. B. Roberts, *Langmuir*, 2005, 21, 5166-5173.
17. I. Capek, *Advances in colloid and interface science*, 2004, 110, 49-74.
18. A. A. Ponce and K. J. Klabunde, *Journal of Molecular Catalysis A: Chemical*, 2005, 225, 1-6.
19. M. A. Mohamed, A. K. Galwey and S. A. Halawy, *Thermochimica acta*, 2005, 429, 57-72.
20. B. Kumar, S. Saha, M. Basu and A. K. Ganguli, *J. Mater. Chem. A*, 2013, 1, 4728-4735.
21. H. S. Kim, S. R. Dhage, D. E. Shim and H. T. Hahn, *Appl. Phys. A-Mater. Sci. Process.*, 2009, 97, 791-798.
22. J. Ryu, H.-S. Kim and H. T. Hahn, *J. Electron. Mater.*, 2011, 40, 42-50.
23. H.-S. Kim, S. R. Dhage, D.-E. Shim and H. T. Hahn, *Applied Physics A*, 2009, 97, 791-798.
24. J. Ryu, H.-S. Kim and H. T. Hahn, *J. Electron. Mater.*, 2010, 40, 42-50.
25. Q.-m. LIU, D.-b. ZHOU, Y. Yamamoto, R. Ichino and M. Okido, *Transactions of Nonferrous Metals Society of China*, 2012, 22, 117-123.
26. Handbook of Nanophysics: Nanoparticles and Quantum Dots, Taylor & Francis, 2010.
27. H. J. Hwang, W. H. Chung and H. S. Kim, *Nanotechnology*, 2012, 23, 485205.

What is claimed is:

1. A method of forming a copper film from a copper nanoparticle ink, consisting of:
    forming an aqueous solution at ambient temperature, the aqueous solution consisting of water as a solvent and a copper salt as a solute;
    adding an amount of a surfactant to the aqueous solution;
    adding an amount of a reducing agent to the aqueous solution at ambient temperature to produce a dispersion of copper and/or copper oxide nanoparticles at ambient temperature and to produce a copper ink at ambient temperature that includes the dispersion of copper and/or copper oxide nanoparticles in the aqueous solution;
    applying the copper ink to a substrate; and
    sintering the copper ink.

2. The method of claim 1, wherein the applying step includes applying the copper ink by inkjet printing, screen printing, gravure, roll-coating, spraying by aerosol, spin-casting, or a combination thereof.

3. The method of claim 1, wherein the substrate is selected from glass, polyethylene terephthalate, silicon, and combinations thereof.

4. The method of claim 1, wherein sintering the copper ink comprises pulsed light sintering of the copper ink.

5. The method of claim 4, wherein the pulsed light sintering comprises applying pulses of light each having an energy of about 1 $Jcm^{-2}$ to about 50 $Jcm^{-2}$ to the copper ink.

6. The method of claim 4, wherein the pulses of light have a total energy of about 1 $Jcm^{-2}$ to about 2000 $Jcm^{-2}$.

* * * * *